Dec. 23, 1952 J. F. ROHS ET AL Re. 23,603

FABRIC COVER

Original Filed July 19, 1949

INVENTORS
OLIVER W. DAVIDSON.
and JOSEPH F. ROHS.
BY
Arnold S. Norfolk
ATTORNEY

Reissued Dec. 23, 1952

Re. 23,603

UNITED STATES PATENT OFFICE 23,603

FABRIC COVER

Joseph F. Rohs, Riverside, Conn., and Oliver Wesley Davidson, New Brunswick, N. J., assignors, by mesne assignments, to Chicopee Manufacturing Corporation, Chicopee Falls, Mass., a corporation of Massachusetts Original No. 2,601,326, dated June 24, 1952, Serial No. 105,588, July 19, 1949. Application for reissue August 19, 1952, Serial No. 305,313

6 Claims. (Cl. 47—26)

Matter enclosed in heavy brackets [ ] appears in the original patent but forms no part of this reissue specification; matter printed in italics indicates the additions made by reissue.

The present invention relates to a fabric cover and more particularly to a shade cloth designed especially for use in the protection of plants such as orchids in horticultural greenhouses.

For many years it has been the practice in cultivating plants such as orchids under greenhouse conditions to use various types of shades on the roof of the greenhouse to control the amount of sunlight falling upon the plants undergoing cultivation. In some instances shade is produced by using various forms of white paint applied directly to the glass panes in the greenhouse ceiling. A more satisfactory practice has involved the use of a roll type lath shade placed on the roof of the greenhouse having alternate opaque and transparent stripes to reduce and diffuse the light reaching the plants.

The object of the present invention is to provide an improved roof including an improved shade cloth which obviates the disadvantages inherent in the use of prior devices including opaque paints or of prior lath shades. A more particular object is the provision of a shade cloth which gives the desirable shade pattern and diffusion characteristic of the lath shade but which is not subject to the limitations and disadvantages thereof. Another object is to provide a shade cloth which produces the desired degree of shade, gives greater diffusion of heat under the shade, affords lower wind resistance and reflects a substantial proportion of the heat-producing infrared rays impinging on the cloth when placed on the roof of a greenhouse.

Another object is to provide an improved shade which increases the amount of sunlight reaching the plants when the sun is low.

The foregoing and other objects and advantages of the invention will become apparent as the description progresses with reference to the three figures of the drawing, wherein.

Figure 1:
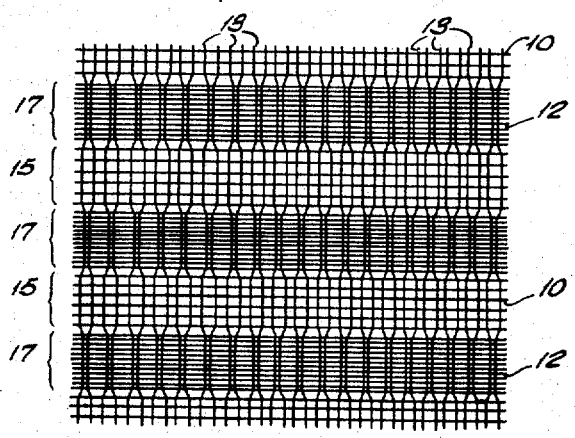
Fig. 1 is a plan view of a fragment of the cloth.
Figure 2:
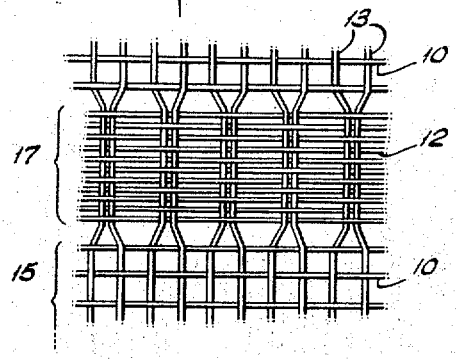
Fig. 2 is an enlarged fragment of Fig. 1.

Referring particularly to Figs. 1 and 2, the preferred cloth in accordance with the present invention comprises a woven fabric formed by a plurality of closely woven horizonal stripes 17 separated from each other by open weave horizontal stripes 15. The closely woven horizontal stripes 17 are substantially opaque and preferably comprise substantially contiguous opaque warp strands 12 interwoven between weft strands 13 which are desirably widely spaced pairs in a plain [one-up, one-down] *two-up, two-down* weave. The transparent stripes 15 preferably comprise widely spaced monofilament warp strands 10 interwoven between the widely spaced weft strands 13. The warp and weft strands from which the fabric is woven are preferably highly reflective opaque round monofilaments such as a white pigmented plastic monofilament having a smooth, shiny surface, white pigmented monofilament formed from vinylidene chloride polymers and copolymers (saran) being ideal. The fabric may be designed to give any specific degree of shade, within wide limits. Thus, for example, a shade which many orchid growers regard as ideal affords a light transmission of 65% with 35% shade. This particular requirement may be met by a 30 x 12 .020" construction of white pigmented saran monofilament: i. e., 30 warp strands interwoven with 12 filling strands per square inch, the individual strand being 0.020" in diameter. In weaving the fabric, it is reeded so that there are 25 ends in an opaque stripe ½" wide and 5 strands in an open weave stripe section ½" wide. Such a fabric provides a high degree of reflection of the infrared rays, affording a cooler greenhouse. On dull days, the white filaments reflect additional sunlight into the greenhouse. This is true also in the evening when the sun is low; the sun's rays which normally would be lost are reflected into the greenhouse, thus lengthening the effective growing day. The fabric is substantially self-cleansing and when required can be readily rolled to a position at the top of the greenhouse, to be lowered when necessary.

Figure 3:
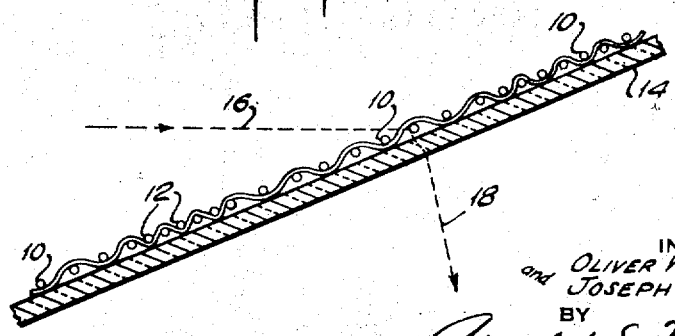
Fig. 3 is a cross section through a glass roof with the fabric overlaid thereon.

Referring particularly to Fig. 3, the fabric of the present invention is shown disposed directly on the glass pane 14 forming the ceiling of the greenhouse. The substantially contiguous opaque warp strands 12 forming the opaque stripe reflect substantially all of the sunlight impinging thereon producing a dense shade pattern in the greenhouse. The open weave stripe formed by the widely spaced warp strands 10 permits a substantial proportion of the incident sunlight to pass therethrough. When the rays of the sun strike the shade cloth at high angles of incidence, such as perpendicular or nearly perpendicular to the plane of the cloth, such rays pass directly through the cloth in the spaces between the widely spaced horizontal strands. Thus when the sun is high, the amount of sunlight reaching the plants is determined by the relative areas of the opaque stripes and light-transmitting stripes. When the sun is low, that is when its rays strike the roof at directions near that indicated by the line 16, the improved shade cloth acts as a reflector to increase the amount of sunlight reaching the plants. Ordinarily with the sun's rays striking the roof from low angles of incidence to the roof, substantially all the rays would be reflected up and out of the greenhouse. However in the shade cloth of this invention the horizontal strands 10 in Fig. 3 which are preferably generally round, smooth, opaque, highly reflective monofilaments, act as reflecting elements and reflect the rays such as 16 along the paths 18 and so reflect sunlight to the plants. This effect is particularly evident when the angle of the incident rays is such that one element 10 shadows the next. In such cases the only sunlight reaching the plants is that reflected by the elements 10 through the cloth.

By virtue of the lattice pattern of the weave, the fabric has a low wind resistance or "sail" effect compared to a uniformly woven fabric having the same number of warp and filling strands per unit area. In addition, the lath pattern weave affords good diffusion of heat between the widely spaced warp 10 and [warp 12] *weft 13* strands in the loosely woven horizontal stripe areas. High reflectivity is provided by the smooth, shiny surface of the white pigmented monofilaments of which the fabric is constructed, and since the pigment is uniformly dispersed throughout the monofilaments, the fabric will retain its color substantially unimpaired throughout its useful life.

It will be apparent to those skilled in the art that many variations may be made from the particular fabric disclosed in the drawings and described immediately above. It will also be apparent that the fabric may be constructed of monofilaments produced from many types of plastic compositions in addition to saran. All these and many other variations are included within the spirit and scope of the invention as defined in the appended patent claims.

The light transmission and wind resistance of typical fabrics in accordance with the present invention are indicated by the data given in Table I.

TABLE I

*Light transmission and wind resistance of special saran fabrics woven for trial as greenhouse shades*

[All fabrics woven with white, opaque, 0.020-inch filament]

| Filaments in Open Mesh Stripe, Per Inch | Construction of Fabric | | Percentage of Light Transmitted | | Wind Resistance Pounds per Square Foot [1] |
|---|---|---|---|---|---|
| | Width of Open Mesh Stripe | Width of Opaque Stripe | Light Rays Perpendicular to Fabric | Diffused and Direct Light Striking Fabric | |
| | *Inches* | *Inches* | | | |
| 8 x 8 | ½ | ½ | 36 | 48 | 4.10 |
| 8 x 8 | ¾ | ¾ | 35 | 49 | 4.04 |
| 8 x 8 | 15/16 | 15/16 | 35 | 49 | 3.81 |
| 10 x 10 | ½ | ½ | 33 | 49 | 4.37 |
| 10 x 10 | ¾ | ¾ | 33 | 46 | 4.31 |
| 10 x 10 | 15/16 | 15/16 | 32 | 46 | 4.25 |
| 12 x 12 | ½ | ½ | 32 | 45 | 4.53 |
| 12 x 12 | ¾ | ¾ | 32 | 45 | 4.44 |
| 12 x 12 | 15/16 | 15/16 | 31 | 44 | 4.36 |
| 12 x 12 | uniform mesh | | 56 | 62 | 3.42 |
| For Comparison— | Space Between Lath: | Width of Lath: | | | |
| Wood-Lath Shade: | | | | | |
| Unpainted-Dark | ½ | ⅞ | 30 | 35 | |
| Painted-Aluminum | ½ | ⅞ | 30 | 38 | |

[1] Determined with wind velocity of 50 M. P. H.

What is claimed is:

1. A roof comprising in combination a transparent supporting surface inclined to the horizontal and a cover on the supporting surface for controlling the amount of sunlight passing through the supporting surface, the cover having alternate opaque and light-transmitting stripes, the light-transmitting stripes comprising horizontal thin reflecting elements, the reflecting elements being widely spaced with respect to their thickness in the plane of the cover to permit direct transmission between the elements and through the supporting surface of sunlight falling on the cover at high angles of incidence, and the reflecting elements having opaque highly reflecting surfaces so placed as to reflect through the supporting surfaces sunlight falling on the cover at low angles of incidence.

2. A roof comprising in combination a transparent supporting surface inclined to the horizontal and a cover on the supporting surface for controlling the amount of sunlight passing through the supporting surface, the cover having alternate opaque and light-transmitting stripes, the light-transmitting stripes comprising horizontal thin reflecting elements, the reflecting elements being widely spaced with respect to their thickness in the plane of the cover to permit direct transmission between the elements and through the supporting surface of sunlight falling on the cover at high angles of incidence, and the reflecting elements being opaque highly reflecting round monofilaments which reflect through the supporting surfaces sunlight falling on the cover at low angles of incidence.

3. A shade cloth having alternate opaque and light-transmitting stripes, the light-transmitting stripes comprising thin reflecting elements widely spaced with respect to their thickness in the plane of the cloth to permit direct transmission through the cloth and between the elements of rays of light falling on the cloth at high angles of incidence, and the reflecting elements having opaque highly reflecting surfaces so placed as to reflect through the cloth rays of light falling on the cloth at low angles of incidence at which one reflecting element shadows the succeeding reflecting element.

4. A shade cloth having alternate opaque and light-transmitting stripes, the light-transmitting stripes comprising thin reflecting elements widely spaced with respect to their thickness in the plane of the cloth to permit direct transmission through the cloth and between the elements of rays of light falling on the cloth at high angles of incidence, and the reflecting elements being opaque highly reflecting round monofilaments which reflect through the cloth rays of light falling on the cloth at low angles of incidence at which one reflecting element shadows the succeeding reflecting element.

5. A shade cloth having alternate opaque and light-transmitting stripes, the light-transmitting stripes comprising thin reflecting elements widely spaced with respect to their thickness in the plane of the cloth to permit direct transmission through the cloth and between the elements of rays of light falling on the cloth at high angles of incidence, and the reflecting elements being opaque highly reflecting round saran monofilaments which reflect through the cloth rays of light falling on the cloth at low angles of incidence at which one reflecting element shadows the succeeding reflecting element.

6. A woven shade cloth in which substantially all of the strands in one direction are opaque highly reflecting round monofilaments, said strands being arranged in alternate opaque and light-transmitting stripes, the opaque stripes being formed by grouping the strands close together to prevent substantial transmission of light through the cloth and the light-transmitting stripes being formed by spacing the strands widely in relation to their thickness whereby rays of light falling on the cloth at high angles of incidence can pass directly through the cloth between the strands and rays of light striking the cloth at angles of incidence at which one strand in a transparent stripe shadows the next strand will be reflected through the cloth.

JOSEPH F. ROHS.
OLIVER WESLEY DAVIDSON.

REFERENCES CITED

The following references are of record in the file of this patent or the original patent:

UNITED STATES PATENTS

| Number | Name | Date |
|---|---|---|
| 2,333,618 | Strauss | Nov. 2, 1943 |
| 2,354,435 | Stedman | July 25, 1944 |
| 2,359,953 | Whewell et al. | Oct. 10, 1944 |

OTHER REFERENCES

Publication, "Textile Design and Colour," by Watson, London, 1912, page 84.